(12) United States Patent
Engel

(10) Patent No.: US 6,370,856 B1
(45) Date of Patent: Apr. 16, 2002

(54) FOREIGN OBJECT EJECTOR FOR ROTARY CONVEYOR EQUIPPED CENTERING AUGERS HAVING CROP LIFTERS AND RECEIVING CROP FROM WIDE PICK-UP

(75) Inventor: Manfred Engel, Grossteinhausen (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/594,252

(22) Filed: Jun. 15, 2000

(51) Int. Cl.7 .................................................. A01F 15/00
(52) U.S. Cl. ............................... 56/341; 56/95; 198/676
(58) Field of Search ............................ 56/341, 343, 85, 56/95, 110; 100/88, 89, 657, 670, 676; 198/657, 670, 676

(56) References Cited

U.S. PATENT DOCUMENTS

| | | | | |
|---|---|---|---|---|
| 2,421,037 A | * | 5/1947 | Ronning | 198/670 |
| 3,662,525 A | * | 5/1972 | White | 56/2 |
| 5,848,523 A | * | 12/1998 | Engel et al. | 56/341 |
| 6,029,434 A | * | 2/2000 | Ratzlaff et al. | 56/341 |
| 6,047,532 A | * | 4/2000 | O'Halloran et al. | 56/95 |
| 6,279,304 B1 | * | 8/2001 | Anstey et al. | 56/341 |

* cited by examiner

Primary Examiner—Thomas B. Will
Assistant Examiner—Nathan Mammen

(57) ABSTRACT

A large round baler includes a wide pick-up which lifts crop from the ground and transfers it to a rotary conveyor including crop centering augers which narrow the crop flow to the width of the baling chamber before it passes through the chamber inlet. The augers are each equipped with crop lifters and associated with each auger is an auger pan structure formed in such a way as to include a relief area into which foreign objects engaged by the crop lifters may go before they are ejected by the rotating crop lifters.

2 Claims, 3 Drawing Sheets

FOREIGN OBJECT EJECTOR FOR ROTARY CONVEYOR EQUIPPED CENTERING AUGERS HAVING CROP LIFTERS AND RECEIVING CROP FROM WIDE PICK-UP

The present invention relates to crop conveying arrangements including a wide pick-up combined with a rotary conveyor, and more specifically, relates to a way of ejecting foreign objects, such as stones, pieces of wood and the like from the rotary conveyors of such arrangements when the rotary conveyors are equipped with centering augers having crop lifters.

BACKGROUND OF THE INVENTION

U.S. application Ser. No. 09/436,329 filed by Anstey et al. on Nov. 8, 1999 discloses a so-called wide pick-up for a large round baler. This pick-up is wider than the baling chamber and has a rotary tine reel equipped with spring tines that deliver crop to a rotary conveyor equipped with right- and left-hand co-axially mounted augers for narrowing the width of the picked up crop to the width of the baling chamber. The rotary conveyor includes a set of rigid tines located between the augers. In order to aid in the delivery of the crop, crop lifters are mounted between the flights of the auger spirals, each lifter having a first end fixed to the auger tubular core and curving radially outward from there to approximately the outer periphery of the auger spiral. Occasionally, a foreign object will be picked up with the crop. If the foreign object is picked up in a central area of the pick-up, little or no damage to the machine will occur due to the spacing of the tine elements which lets the object fall out or just feeds it on into the baling chamber to be rolled up with the crop. If, however, the foreign object enters either auger area, it may enter close to where the lifter joins the auger core tube and become wedged between the crop lifter and the auger pan, as the clearance between the lifter and pan decreases, causing damage.

SUMMARY OF THE INVENTION

According to the present invention, there is provided an improvement to the crop conveying arrangement disclosed in the above-identified patent application.

An object of the invention is to provide a wide pick-up in combination with a rotary conveyor including centering augers and associated crop lifters wherein the auger pan is specially designed for aiding in the ejection of stones engaged by the augers.

A more specific object of the invention is to provide a wide pick-up in combination with a rotary conveyor, as set forth in the immediately preceding object, wherein each auger is associated with an auger pan provided with a relief area in the vicinity of the rotating crop lifters so that foreign objectss may enter this relief area and be engaged and kicked out by the rotating crop lifters.

A still more specific object of the invention is to provide a wide pick-up and rotary conveyor, as defined in the immediately preceding object, wherein a forward part of each auger pan is formed by comb-like projections which serve to mount upper rear ends of U-shaped, crop strippers, in the form of relatively flat bands, for stripping crop from the tines of the pick-up, with the projections in the vicinity of the crop lifters being angled downwardly relative to the other projections so as to define a relief area.

These and other objects of the invention will become apparent from a reading of the ensuing description together with the appended drawings.

DESCRIPTION OF THE PREFERRED EMBODIMENT

Figure 1:
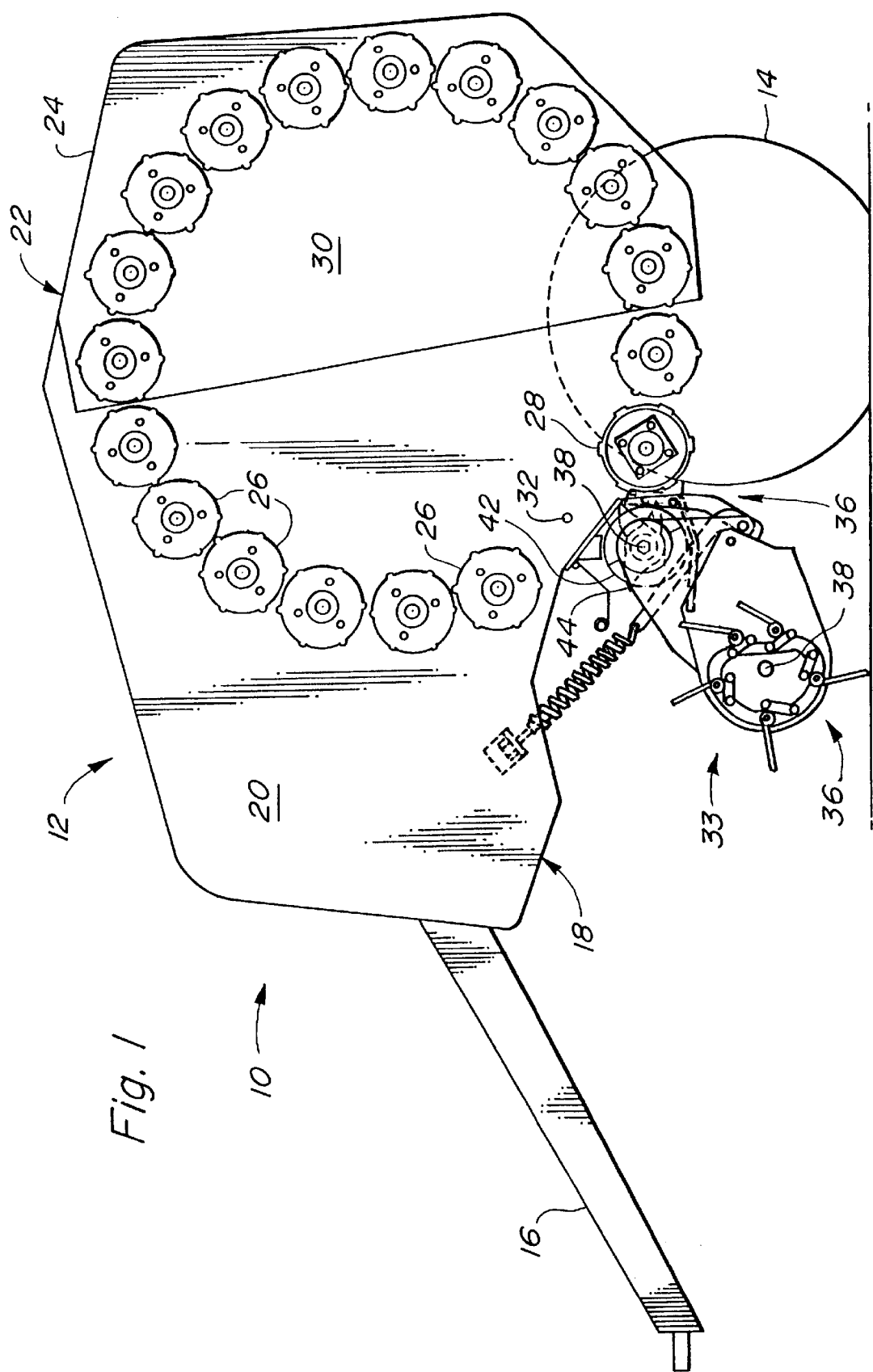
FIG. 1 is a somewhat schematic left side elevational view of a large round baler equipped with a wide pick-up, together with a rotary conveyor of the type with which the present invention is particularly adapted for use.

Referring now to FIG. 1, there is shown a baler 10 for making large cylindrical bales. The baler 10 includes a main frame or chassis 12 supported on a pair of ground wheels 14 and from which a draft tongue 16 extends forwardly for being coupled to a towing vehicle, such as an agricultural tractor, not shown. The frame 12 includes a front section 18, including a pair of opposite side walls 20; and a rear section in the form of a discharge gate 22 having opposite side walls 24, the discharge gate 22 being pivotally attached to an upper rear location of the front section 18 for pivotal movement between a lowered working position, as illustrated, and a raised discharge position for permitting a formed bale to drop onto the ground. Extending between and mounted to the side walls 20 of the front frame section 18 and the side walls 24 of the discharge gate 22 are a plurality of bale-forming elements, here shown as a plurality of like rolls 26 and a larger floor roll 28 arranged in a substantially circular pattern so as to cooperate with the side walls 20 and 24 to define a fixed volume baling chamber 30. The lower front roll 26 and the bale support roll 28 are spaced from each other so as to define an inlet 32 through which crop may be fed so as to be rolled into a bale by the action of the rolls 26 and 28. It is to be noted that the present invention could be used with a baler having a variable volume baling chamber instead of the fixed volume baling chamber 30 disclosed here.

Provided for delivering windrowed crop into the baling chamber 30 by way of the inlet 32 is a crop conveying arrangement 33 including a wide pick-up 34 and a rotary conveyor 36. The rotary conveyor 36 includes a center shaft 38 that is mounted to the front frame section 18 for rotation about a horizontal transverse axis.

Figure 2:
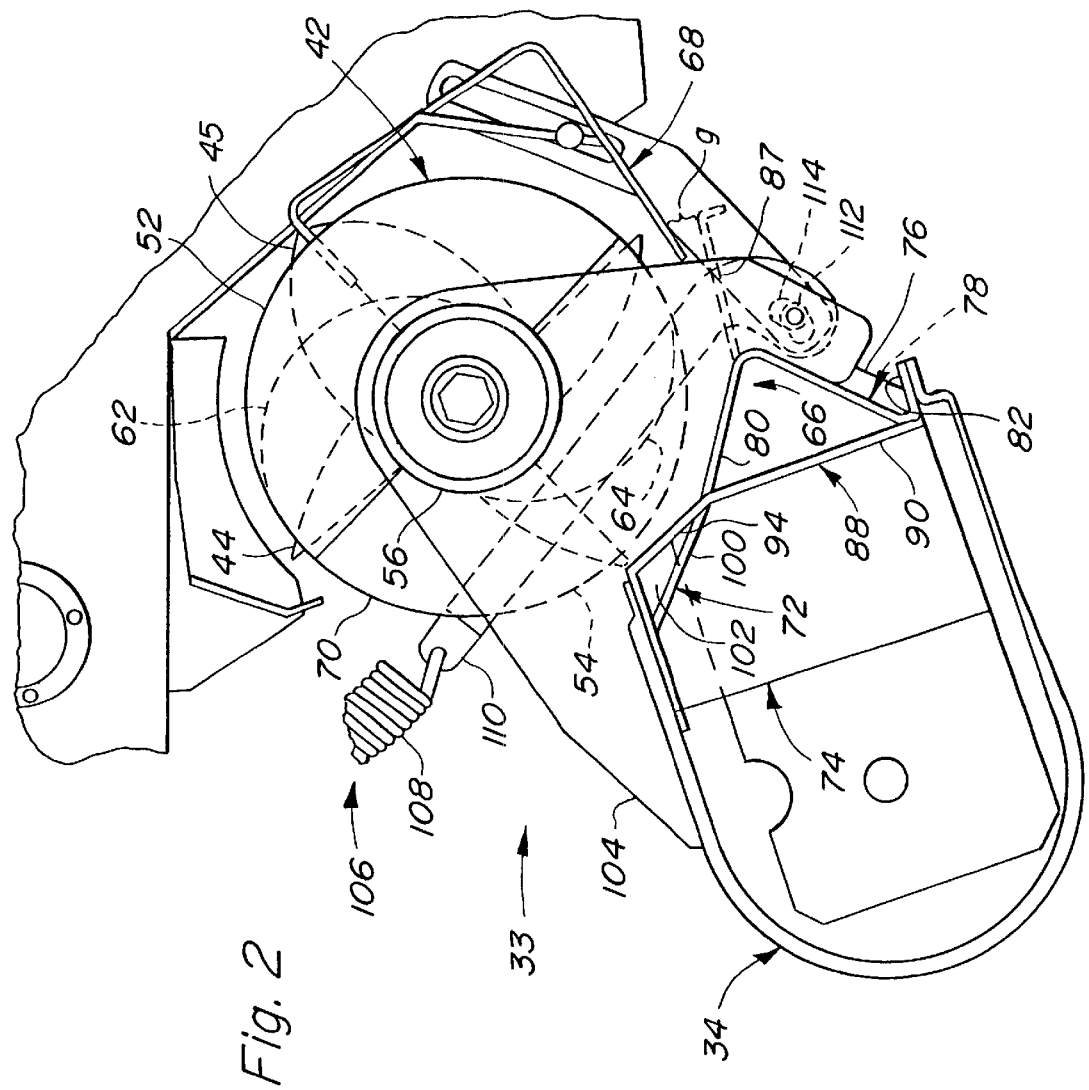
FIG. 2 is an enlarged left side elevational view showing the wide pick-up and rotary conveyor of the present invention, but with structure, including the pick-up tine assembly, omitted for simplicity.
Figure 3:
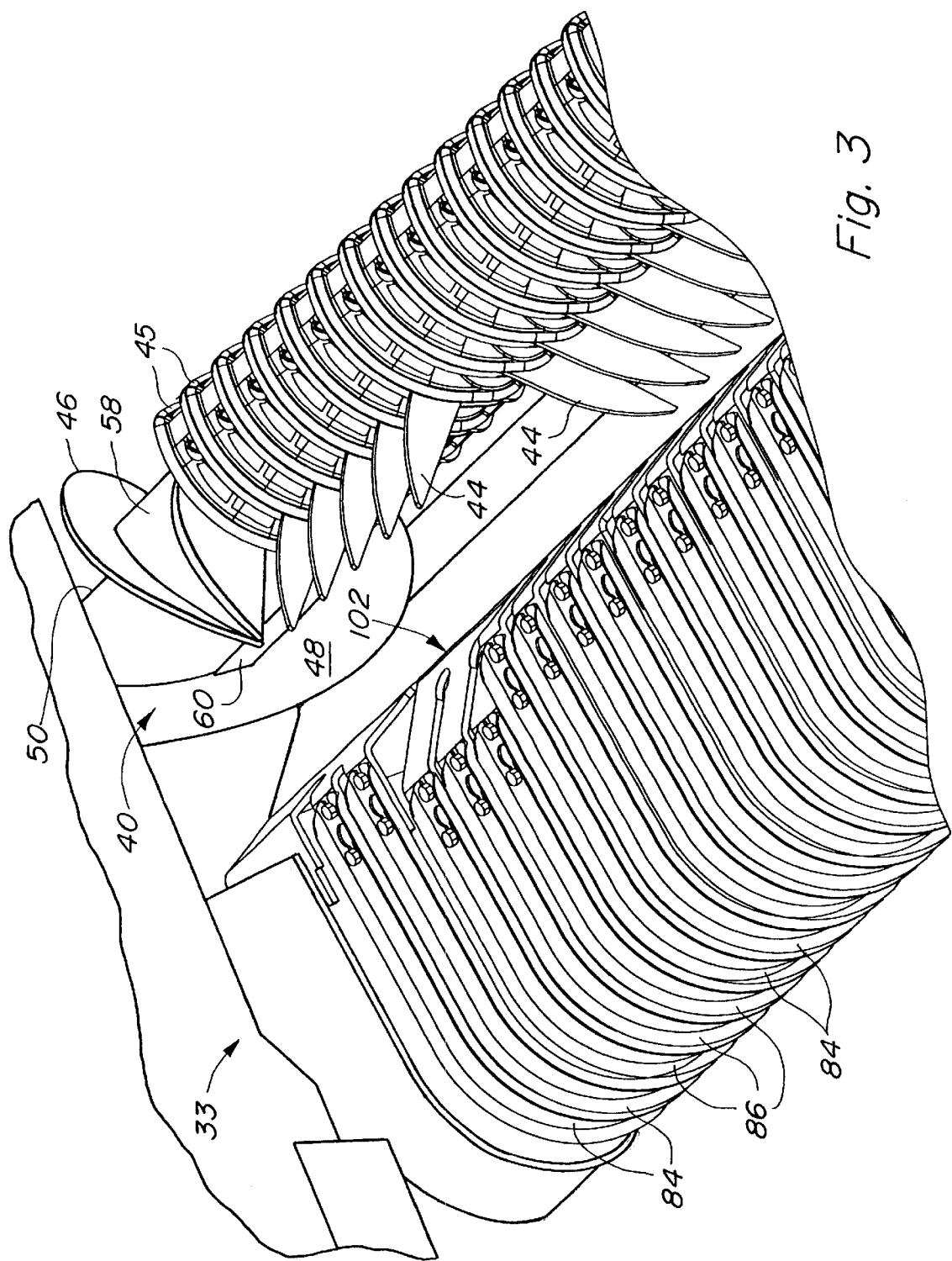
FIG. 3 is a perspective view looking towards the top of the right-hand side of the pickup, again with structure omitted, and the rotary conveyor showing the structure for allowing stones to be ejected from the auger pan.

Referring now also to FIGS. 2 and 3, it can be seen that the rotary conveyor 36 includes right- and left-hand centering augers 40 and 42. A plurality of rigid, plate-like tines 44 are mounted at transversely spaced locations between the augers 40 and 42, and mounted in spaced side-by-side relationship, so that the tines 44 pass between adjacent ones of them, are a plurality of stripper members 45, that, as viewed from the side, are oval-shaped. The right-hand auger 40 includes a pair of angularly offset, spiral flights 46 and 48 connected to a cylindrical core 50 (FIG. 3), and with the left-hand auger 42 including a pair of angularly offset, spiral flights 52 and 54 fixed to a cylindrical core 56 (FIG. 2). Located at the inner end portion of the right-hand auger 40, and respectively associated with the spiral flights 46 and 48, are first and second crop lifters 58 and 60, each of which is in the form of an arcuately curved, plate tapered from a wide end disposed parallel to the rotational axis of the conveyor 36 and fixed to the core 50, to a narrow end located adjacent the outer peripheries of the flights 46 and 48. The lifters 58 and 60 are angularly offset 180° from each other about the axis of the core 50 and extends approximately 90° about the axis of the core 50, with the curvature of the lifters 58 and 60 being such that the distance from the core axis gradually increases in the direction away from the wide end that is secured to the core 50. An inner edge of each of the crop lifters 58 and 60 is respectively secured to a leading face of the spiral flights 46 and 48, and respective outer edges of each of the lifters 58 and 60 terminate adjacent the inner end of the core 50 in a plane that is perpendicular to the axis of the core 50. As viewed in FIGS. 1 and 2, the rotary conveyor 36 rotates clockwise so the wide end of each of the lifters 58 and 60 is a leading end. Thus it will be appreciated that the lifters 58 and 60 engage crop delivered to the auger 40 by the pick-up 34 and lift the crop to the outer periphery of the auger 40.

The left-hand auger 42 includes crop lifters 62 and 64 which are respectively associated with the spiral flights 52 and 54 and are similar in shape to, and mounted in a manner similar to the mounting of, each of the crop lifters 58 and 60.

Each of the augers 40 and 42 is provided with an auger pan structure 66 including a rear pan section 68 defined by various transversely extending support frame surfaces extending parallel to the axis of rotation of the rotary conveyor 36 so as to define three integral sides disposed adjacent a circular path 70 traced by the outer periphery of each of the augers 40 and 42. Each rear pan section 68 is fixed to the main frame 12 and extends about the axis of rotation of the conveyor 36 from approximately the two o'clock position to the five o'clock position, as viewed in FIG. 2. Each auger pan structure 66 further includes a lower front pan section 72, that is separate from the rear pan section 68 and is formed partly by a pick-up frame 74.

Specifically, the pick-up frame 74 comprises a weldment including opposite side plates 76 that have angular rear ends defined by converging bottom and top edge portions. A first angular member 78, which is roughly Z-shaped in end view, extends between and joins the opposite side plates 76. A side 80, forming the top of the Z defines an intermediate part of the front pan section 72, while a side 82, forming the bottom of the Z forms a mounting surface for a lower rear end of each of a plurality of U-shaped stripper bands, a majority of the bands being long bands 84 (FIG. 3), while those bands that are in fore-and-aft alignment with the crop lifters at each side of the rotary conveyor 36 are somewhat shorter bands 86, as will become apparent from the following description. A rear part of each front pan section 72 is formed by a transverse plate member 87 that is fixed to, and extends rearwardly from the top of the Z beneath the augers 40 and 42 in overlapping relationship to the lower front edge of the associated rear pan section 68 so as to define a gap g therebetween. Also extending between and joining the side plates 76 is a second angular member 88 having an upright, lower portion 90, which constitutes approximately a lower half of the member 88 and is positioned against the front of the first angular member 78. A top portion of the second angular member 88 is defined by a plurality of transversely spaced fingers having two different orientations. Specifically, the first fingers each include a lower section 94 angled upwardly and forwardly from the top of the lower portion 90 at a first angle of about 30° from the lower portion 90, which disposes the lower finger section 94 so as to serve as part of the front pan section 72, the first finger having a forwardly projecting end section 96 that is parallel to the bottom of the Z-shaped first angular member 78 and serves as a mounting surface for the upper rear end of a respective one of the long stripper bands 84. Second fingers are located in respective zones on the opposite sides of the pick-up that are in fore-and-aft alignment with the crop lifters 58 and 60, and with the crop lifters 62 and 64. The second fingers include lower sections 100 that are also angled upwardly and forwardly from the lower portion 90 so as to serve as part of the front pan section 72, but these are angled at approximately 60° from the lower portion 90. Thus, the second finger sections 100 are spaced further away from the rotational path of the crop lifters 58 and 60, or 62 and 64 so as to define respective relief zones 102 for providing a relieved area for foreign objects so that they do not become wedged between the auger pan structures 66 and the associated crop lifters 58 and 60, or 62 and 64. Once a foreign object is located in one or the other of the relief zones 102, it is likely expelled forwardly by the rotating crop lifters 58 and 60, or 62 an 64.

It is here noted that the pick-up frame 74 further includes opposite side members 104, which extend up and toward the rear and are mounted to the frame 12 for pivoting about the axis of the center shaft 38 of the rotary conveyor 36, thereby establishing an axis about which the pick-up 34 may float vertically during operation. Thus, each front auger pan section 72 will float with the pick-up 34 and remain properly disposed for functioning as an auger pan. It is noted that when the pick-up 33 is in a normal working range, as shown in FIG. 2, the plate member 87 will be angled upwardly from front to rear so that crop pieces will be retained. However, when the pick-up is raised to its transport position, the plate member 87 will be downwardly inclined from front to rear so that crop pieces will fall out and water will drain through the gap g so that accumulations of water and/or crop do not occur such as to result in rust and spoiled crop which would increase resistance to floatation of the pick-up and/or the proper feeding of crop during operation.

A pair of float spring assemblies 106 are respectively mounted between the main frame 12 and the pick-up frame 74 so as to support a major portion of the weight of the pick-up 34. Each float spring assembly 106 includes a coil tension spring 108 connected between a spring end coupler, not shown, anchored to the frame 12, and an L-shaped link 110, carrying a roller 112 received in a kidney shaped aperture 114 provided at a lower rear location of the adjacent pick-up side member 104.

What is claimed is:

1. In an agricultural crop processing machine having a crop pick-up located forwardly of a crop processing arrangement and having a width dimension greater than, and being adapted for picking up a crop windrow having a width greater than, that of said crop processing apparatus, further crop conveying elements located between said pick-up and said crop processing apparatus including right- and left-hand crop centering augers having flighting fixed to a central cylindrical core and being pitched for conveying crop inwardly to a width commensurate with that of said crop processing arrangement, each auger being equipped with a crop lifter assembly including at least one crop lifter plate located on an inner section of the associated core and including a first end extending inwardly from a base location of a leading face of said flighting and being fixed to said core, with said lifter plate being curved outwardly from said core and terminating at an inner end of the associated auger, and a pan extending beneath and receiving a lower portion of each auger, with the latter rotating such that its associated crop lifter assembly sweeps forwardly through said pan, the improvement comprising: each pan having a forward section in the vicinity of the path of rotation of said crop lifter assembly which is shaped so as to diverge from said path of rotation solely in the vicinity of said crop lifter assembly to thereby form a relief area through which foreign objects may be expelled when engaged by said crop lifter assembly.

2. The agricultural crop processing machine, as defined in claim 1, wherein said pick-up includes a plurality of transversely spaced, generally U-shaped tine strippers; each of said pans including a forward side defined by a plurality of transversely spaced comb-like structures respectively located in fore-and-aft alignment with said tine strippers and having upper ends supporting upper rear ends of said tine strippers; and said comb-like structures including several which are located in the vicinity of the path of rotation of the crop lifter assembly of an associated one of the stub augers and angled forwardly relative to said path to define said relief area.

\* \* \* \* \*